United States Patent
Takano et al.

(10) Patent No.: US 11,942,596 B2
(45) Date of Patent: Mar. 26, 2024

(54) SOLID ELECTROLYTE MATERIAL, SOLID ELECTROLYTE LAYER, AND ALL SOLID STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Takeo Ishikura, Nagaokakyo (JP); Akisuke Ito, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 760 days.

(21) Appl. No.: 16/703,141

(22) Filed: Dec. 4, 2019

(65) Prior Publication Data
US 2020/0112056 A1    Apr. 9, 2020

Related U.S. Application Data

(63) Continuation of application No. PCT/JP2018/031941, filed on Aug. 29, 2018.

(30) Foreign Application Priority Data

Aug. 31, 2017  (JP) ................. 2017-167179

(51) Int. Cl.
*H01M 10/052*  (2010.01)
*H01M 4/38*  (2006.01)
*H01M 10/0562*  (2010.01)

(52) U.S. Cl.
CPC ....... *H01M 10/0562* (2013.01); *H01M 4/382* (2013.01); *H01M 10/052* (2013.01); *H01M 2300/0071* (2013.01)

(58) Field of Classification Search
CPC .......... H01M 10/052; H01M 10/0562; H01M 4/382; H01M 2300/0071
See application file for complete search history.

(56) References Cited

U.S. PATENT DOCUMENTS

| | | | |
|---|---|---|---|
| 9,531,036 B2 | 12/2016 | Ohta et al. | |
| 9,537,175 B2 | 1/2017 | Kintaka | |
| 10,403,931 B2 | 9/2019 | Holme et al. | |
| 2014/0011100 A1* | 1/2014 | Lee | ..... H01M 10/052 429/189 |
| 2014/0186720 A1* | 7/2014 | Kintaka | ..... C01G 25/006 429/322 |
| 2015/0056519 A1 | 2/2015 | Ohta et al. | |

(Continued)

FOREIGN PATENT DOCUMENTS

| JP | 2013140762 A | 7/2013 |
|---|---|---|
| JP | 2014170734 A | 9/2014 |

(Continued)

OTHER PUBLICATIONS

International Search Report issued in PCT/JP2018/031941, dated Nov. 27, 2018.

(Continued)

*Primary Examiner* — Osei K Amponsah
(74) *Attorney, Agent, or Firm* — ArentFox Schiff LLP

(57) ABSTRACT

A solid electrolyte material that includes a composite oxide containing Li and Bi, and at least one solid electrolyte having a garnet structure, a perovskite structure, and a LISICON structure.

14 Claims, 1 Drawing Sheet

(56) References Cited

U.S. PATENT DOCUMENTS

2015/0099188 A1* 4/2015 Holme ................ C04B 35/6261
  429/231.95
2015/0333330 A1 11/2015 Sato et al.

FOREIGN PATENT DOCUMENTS

| | | | |
|---|---|---|---|
| JP | 2015041573 A | 3/2015 | |
| JP | 2015204215 A | 11/2015 | |
| JP | 2016001596 A | 1/2016 | |
| JP | 2016535391 A | 11/2016 | |
| WO | 2018123479 A1 | 7/2018 | |

OTHER PUBLICATIONS

Written Opinion of the International Searching Authority issued in PCT/JP2018/031941, dated Nov. 27, 2018.

* cited by examiner

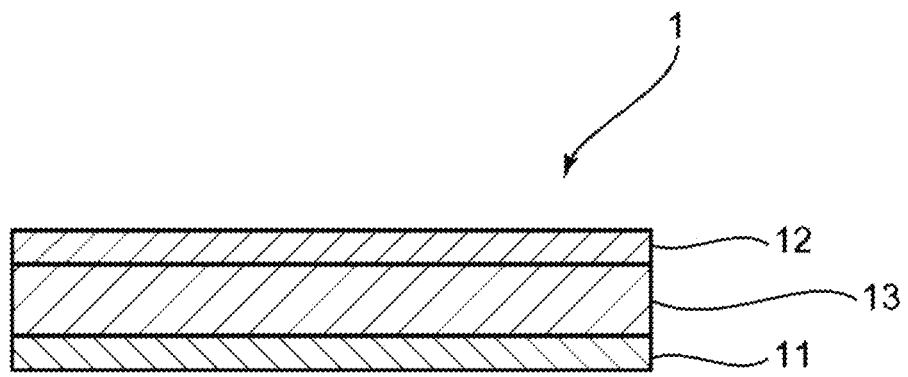

SOLID ELECTROLYTE MATERIAL, SOLID ELECTROLYTE LAYER, AND ALL SOLID STATE BATTERY

CROSS REFERENCE TO RELATED APPLICATIONS

The present application is a continuation of International application No. PCT/JP2018/031941, filed Aug. 29, 2018, which claims priority to Japanese Patent Application No. 2017-167179, filed Aug. 31, 2017, the entire contents of each of which are incorporated herein by reference.

FIELD OF THE INVENTION

The present invention relates to a solid electrolyte material, a solid electrolyte layer, and an all solid state battery.

BACKGROUND OF THE INVENTION

Conventionally, all solid state batteries are known to be batteries which are excellent in reliability and safety. For example, Patent Document 1 discloses, as a solid electrolyte material for use in an all solid state battery, a material for cubic garnet-type solid electrolyte, which is an oxide containing Li, La, Zr, and Bi in which a part or all of the La site is substituted with Bi. In addition, Patent Document 1 describes a need for firing at a high temperature of 900° C. to 1150° C., in the production of the material for the cubic garnet-type solid electrolyte described in Patent Document 1.

Patent Document 1: Japanese Patent Application Laid-Open No. 2014-170734

SUMMARY OF THE INVENTION

As described in Patent Document 1, in the case of firing at a high temperature of 900° C. to 1150° C., for example, an element which is likely to disappear, such as Li, may disappear during the firing. Accordingly, a solid electrolyte material is desired which can be fired at a low temperature of 800° C. or lower. Specifically, for example, a solid electrolyte material which can achieve a high ionic conductivity even in the case of firing at a low temperature of 800° C. or lower.

A main object of the present invention is to provide a solid electrolyte material capable of achieving a high ionic conductivity even in the case of firing at a low temperature of 800° C. or lower.

The solid electrolyte material according to the present invention includes a composite oxide containing Li and Bi, and a solid electrolyte having a garnet structure, a perovskite structure, or a LISICON structure.

According to the present invention, a solid electrolyte material can be provided which is capable of achieving a high ionic conductivity, in the case of firing at a low temperature of 800° C. or lower.

BRIEF EXPLANATION OF THE DRAWING

The FIGURE is a schematic cross-sectional view of an all solid state battery according to one embodiment of the present invention.

DETAILED DESCRIPTION OF PREFERRED EMBODIMENTS OF THE INVENTION

An example of a preferred embodiment of the present invention will be described below. However, the following embodiment is considered by way of example only. The present invention is not limited to the following embodiment in any way.

(Solid Electrolyte Material)

According to the present embodiment, a solid electrolyte material includes a composite oxide containing Li and Bi, and a solid electrolyte having a garnet structure, a perovskite structure, or a LISICON structure. Thus, as understood from the results of the following examples and comparative examples, even in a case where the solid electrolyte material according to the present embodiment is subjected to, for example, firing at a low temperature of 800° C. or lower, a high ionic conductivity can be achieved. Accordingly, the use of the solid electrolyte material according to the present embodiment can achieve a solid electrolyte layer and an electrode which have a high ionic conductivity, and a battery including at least one of the layer and the electrode.

The reason why the ionic conductivity in the case of low-temperature firing is increased in a case where the composite oxide containing Li and Bi is added to the solid electrolyte having a garnet structure, a perovskite structure, or a LISICON structure is not clear, but believed to be that the composite oxide containing Li and Bi functions suitably as a sintering aid, and causes liquid-phase sintering to proceed during sintering. Thus, it is believed that a member including a solid electrolyte which is high in relative density and high in ionic conductivity is achieved even in the case of firing at a low temperature.

It is to be noted that in the present invention, the solid electrolyte material has only to include at least one solid electrolyte selected from the group consisting of a solid electrolyte having a garnet structure, a solid electrolyte having a perovskite structure, and a solid electrolyte having a LISICON structure. In the present invention, the solid electrolyte material may include two or more solid electrolytes selected from the group consisting of a solid electrolyte having a garnet structure, a solid electrolyte having a perovskite structure, and a solid electrolyte having a LISICON structure. In the present invention, the solid electrolyte material may include at least one solid electrolyte selected from the group consisting of a solid electrolyte having a garnet structure, a solid electrolyte having a perovskite structure, and a solid electrolyte having a LISICON structure, and additionally, other solid electrolytes.

In the present invention, the solid electrolyte material may further include, for example, a NASICON-type solid electrolyte, a ramsdellite-type solid electrolyte, Li-β alumina, and the like.

From the viewpoint of further increasing the ionic conductivity of the solid electrolyte material fired at a low temperature, the solid electrolyte preferably has a garnet structure or a LISICON structure, and more preferably has a garnet structure. Above all, solid electrolytes that have a garnet structure represented by a composition formula $(Li_{[7-ax-(b-4)y]}A_x)La_3Zr_{2-y}B_yO_{12}$ are yet more preferably used. Among the solid electrolytes that have a garnet structure represented by a composition formula $(Li_{[7-ax-(b-4)y]}A_x)La_3Zr_{2-y}B_yO_{12}$, and $(Li_{6.4}Ga_{0.05}Al_{0.15})La_3Zr_2O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3(Zr_{1.75}Nb_{0.25})O_{11}$, $(Li_{6.45}Al_{0.1})La_3(Zr_{1.75}Nb_{0.25})O_{12}$, $(Li_{6.175}Al_{0.1})La_3(Zr_{1.475}Ta_{0.105}Bi_{0.42})O_{12}$, or $Li_{6.6}La_3(Zr_{1.6}Ta_{0.4})O_{12}$ are yet more preferably used. The reason therefor is not clear, but believed to be because a further enhanced sintering promotion effect is achieved, due to favorable wettability between the melt of the composite oxide containing Li and Bi and the solid electrolyte having a garnet structure or a LISICON structure, in particular, more favorable wettability between the melt and the solid electrolyte having a garnet structure.

It is to be noted that in the above composition formula, A represents at least one element selected from the group consisting of Ga, Al, Mg, Zn, and Sc; B represents at least one element selected from the group consisting of Nb, Ta, W, Te, Mo, and Bi; 0≤x≤0.5; 0≤y≤2.0; a represents an average valence for A; and b represents an average valence for B.

From the viewpoint of further improving the wettability of the melt of the composite oxide to the solid electrolyte, the composite oxide preferably contains trivalent or pentavalent Bi, more preferably contains trivalent Bi.

When the composite oxide is turned into a sintered body, the sintered body does not substantially function as a solid electrolyte. Thus, from the viewpoint of increasing the ionic conductivity of the sintered body, the content of the composite oxide in the solid electrolyte material is preferably lower. For example, rather than the cases where $Li_3BO_3$, $Li_3PO_4$, and $Li_4SiO_4$, which are known sintering aids, are used as composite oxide, the use of the composite oxide containing Li and Bi as in this embodiment can reduce the content of the composite oxide in the solid electrolyte material. The reason therefor is not clear, but believed to be because the composite oxide containing Li and Bi is turned into a liquid phase, for example, even at a low temperature of 800° C. or low, and the composite oxide containing Li and Bi, turned into the liquid phase, has favorable wettability to the solid electrolyte, and produces an enhanced sintering promotion effect.

More specifically, the composite oxide containing Li and Bi preferably has a melting point of 800° C. or lower.

From the viewpoint of achieving a member including a solid electrolyte which is high in relative density and high in ionic conductivity, the content of the composite oxide in the solid electrolyte material is preferably less than 20% by volume, and more preferably 10% by volume or less, yet more preferably 5% by volume or less. However, when the content of the composite oxide in the solid electrolyte material is excessively low, an insufficient sintering promotion effect may be achieved. Accordingly, the content of the composite oxide in the solid electrolyte material is preferably 0.5% by volume or more, more preferably 1.0% by volume or more.

From the viewpoint of achieving a member including a solid electrolyte which is high in relative density and high in ionic conductivity, the molar ratio (Li/Bi) of Li to Bi in the composite oxide is preferably 1.0 or more. It is believed that the molar ratio (Li/Bi) of Li to Bi in the composite oxide to be 1.0 or more, thereby making it possible to improve the wettability of the melt of the composite oxide to the solid electrolyte in the case of sintering, and thus achieve a higher relative density and a higher ionic conductivity.

The composite oxide containing Li and Bi may further contain an element other than Li, O, and Bi, for example, at least one element such as B, Si, P, W, Mo, and Te. In this case, the melting point of the composite oxide can be further lowered, and the viscosity of the composite oxide melt can be further lowered. For this reason, the sintering promotion effect of the composite oxide can be further enhanced.

In the present invention, the solid electrolyte material may further contain, depending on the use application, a substance other than the solid electrolyte and the composite oxide containing Li and Bi. In the present invention, the solid electrolyte material may further include, for example, at least one of a composite oxide composed of La and Zr, a composite oxide composed of Li and Zr, a composite oxide composed of Li and Al, and the like.

(All Solid State Battery)

The FIGURE is a schematic cross-sectional view of an all solid state battery 1 according to the preset embodiment. The all solid state battery 1 shown in the FIGURE is specifically a co-fired all solid state battery. The all solid state battery according to the present invention is, however, not limited to the co-fired all solid state battery. The all solid state battery according to the present invention may have a positive electrode, a solid electrolyte layer, and a negative electrode fired separately.

As shown in the FIGURE, the all solid state battery 1 includes a negative electrode 12, a positive electrode 11, and a solid electrolyte layer 13. The solid electrolyte layer 13 is provided on the negative electrode 12. The positive electrode 11 is provided on the solid electrolyte layer 13. The solid electrolyte layer 13 is sandwiched between the positive electrode 11 and the negative electrode 12. Since the all solid state battery 1 is a co-fired all solid state battery, the negative electrode 12, the solid electrolyte layer 13, and the positive electrode 11 are fired integrally to serve as an integrally fired body.

In the present embodiment, the solid electrolyte layer 13 is composed of a fired product of the solid electrolyte material according to the present embodiment. In the solid electrolyte layer 13, the composite oxide containing Li and Bi may be present as an amorphous body, or may be present as a crystal. In the solid electrolyte layer 13, however, the composite oxide containing Li and Bi is preferably present as an amorphous body. This is because, in this case, the ionic conductivity of the solid electrolyte layer 13 can be further increased.

The positive electrode 11 includes positive electrode active material particles. Examples of the positive electrode active material particles preferably used include lithium-containing phosphate compound particles which have a NASICON-type structure, lithium-containing phosphate compound particles which have an olivine-type structure, lithium-containing layered oxide particles, lithium-containing oxide particles which have a spinel-type structure. Specific examples of the preferably used lithium-containing phosphate compounds which have a NASICON-type structure include $Li_3V_2(PO_4)_3$. Specific examples of the preferably used lithium-containing phosphate compound which has an olivine-type structure include $Li_3Fe_2(PO_4)_3$ and $LiMnPO_4$. Specific examples of the preferably used lithium-containing layered oxide particles include $LiCoO_2$ and $LiCo_{1/3}Ni_{1/3}Mn_{1/3}O_2$. Specific examples of the preferably used lithium-containing oxides which have a spinel-type structure include $LiMn_2O_4$, $LiNi_{0.5}Mn_{1.5}O_4$, and $Li_4Ti_5O_{12}$. Only one of these positive electrode active material particles may be used, or two or more thereof may be used in mixture.

The positive electrode 11 may further include a solid electrolyte. The type of solid electrolyte included in the positive electrode 11 is not particularly limited, but it is preferable to include the same type of solid electrolyte as the solid electrolyte included in the solid electrolyte layer 13. In this case, in the positive electrode 11, the composite oxide containing Li and Bi may be present as an amorphous body, or may be present as a crystal. In the positive electrode 11, however, the composite oxide containing Li and Bi is preferably present as an amorphous body. This is because, in this case, the ionic conductivity of the positive electrode 11 can be further increased.

The negative electrode 12 includes negative electrode active material particles. Examples of the negative electrode active material particles preferably used include compound particles represented by $MO_x$ (M is at least one selected from the group consisting of Ti, Si, Sn, Cr, Fe, Nb and Mo. $0.9 \leq X \leq 2.0$), graphite-lithium compound particles, lithium metal, lithium alloy particles, lithium-containing phosphate compound particles which have a NASICON structure, lithium-containing phosphate compound particles which have an olivine structure, and lithium-containing oxide particles which have a spinel structure. Specific examples of the lithium alloy preferably used include Li—Al alloys. Specific examples of the preferably used lithium-containing phosphate compounds which have a NASICON-type structure include $Li_3V_2(PO_4)_3$. Specific examples of the preferably used lithium-containing phosphate compound which has an olivine-type structure include $Li_3Fe_2(PO_4)_3$. Specific examples of the preferably used lithium-containing oxides which have a spinel-type structure include $Li_4Ti_5O_{12}$. Only one of these negative electrode active material particles may be used, or two or more thereof may be used in mixture.

The negative electrode 12 may further include a solid electrolyte. The type of solid electrolyte included in the negative electrode 12 is not particularly limited, but it is preferable to include the same type of solid electrolyte as the solid electrolyte included in the solid electrolyte layer 13. In this case, in the negative electrode 12, the composite oxide containing Li and Bi may be present as an amorphous body, or may be present as a crystal. In the negative electrode 12, however, the composite oxide containing Li and Bi is preferably present as an amorphous body. This is because, in this case, the ionic conductivity of the negative electrode 12 can be further increased.

(Method for Producing all Solid State Battery 1)

Next, an example of a method for producing the all solid state battery 1 as a co-fired all solid state battery will be described.

First, a paste is prepared by appropriately mixing the active material particles and the solid electrolyte with a solvent, a resin, and the like. The paste is applied onto a sheet, and dried to form a first green sheet for constituting the positive electrode 11. Likewise, a second green sheet for constituting the negative electrode 12 is formed.

A paste is prepared by appropriately mixing the solid electrolyte with a solvent, a resin, and the like. The paste is applied and dried to prepare a third green sheet for constituting the solid electrolyte layer 13.

Next, the first to third green sheets are appropriately stacked to prepare a stacked body. The prepared stacked body may be pressed. Preferred pressing methods include isostatic press.

Thereafter, the stacked body is subjected to sintering, thereby making it possible to obtain the all solid state battery 1.

As described above, the solid electrolyte material for use in the present embodiment can achieve a high ionic conductivity, even in the case of, for example, firing at a low temperature of 800° C. or lower. For this reason, the all solid state battery 1 has the solid electrolyte layer 13 with a high ionic conductivity, even in the case of the production by firing at a low temperature. Thus, the all solid state battery 1 has excellent battery characteristics.

Furthermore, it is possible to produce the all solid state battery 1 by firing at a low temperature, thus for example, effectively keeping side reactions between the solid electrolyte and the active material or like from being developed.

Accordingly, the all solid state battery 1 can achieve a high charge/discharge capacity, and excellent charge/discharge rate characteristics.

Hereinafter, the present invention will be described in more detail, based on specific examples, but the present invention is not to be considered limited to the following examples in any way, and can be worked with changes appropriately made without changing the scope of the invention.

Comparative Example 1

[Synthesis of Solid Electrolyte]

Raw materials containing lithium hydroxide monohydrate ($LiOH \cdot H_2O$), gallium oxide ($Ga_2O_3$), aluminum oxide ($Al_2O_3$), lanthanum hydroxide ($La(OH)_3$), zirconium oxide ($ZrO_2$) were weighed so as to provide a solid electrolyte composition as shown in Table 1 below. Next, the raw materials with water added thereto were encapsulated in a 100 ml polyethylene pot made of polyethylene, and rotated at 150 rpm for 16 hours on a pot rack to mix the raw materials. It is to be noted that the lithium hydroxide monohydrate $LiOH \cdot H_2O$ as a Li source was put excessively by 3% by mass with respect to the target composition in consideration of Li deficiency during sintering.

Next, the obtained slurry was dried, and then subjected to calcination at 1000° C. for 5 hours.

Next, a mixed solvent of toluene-acetone was added to the obtained calcined product, and the mixture was subjected to grinding with a planetary ball mill for 12 hours, and then dried to obtain a solid electrolyte powder with the composition shown in Table 1.

[Preparation of Tablet]

The solid electrolyte powder prepared as mentioned above, a butyral resin, and an alcohol were mixed in proportions by mass of 200:15:140, and alcohol was then removed on a hot plate at 80° C., thereby providing a solid electrolyte powder coated with the butyral resin to serve as a binder.

Next, the solid electrolyte powder coated with butyral resin was pressed at 90 MPa and molded into a tablet shape with the use of a tablet molding machine. The obtained solid electrolyte tablet was subjected to firing at a temperature of 500° C. under an oxygen atmosphere, thereby removing the butyral resin, and then subjected to firing at the temperature shown in Table 1 for 10 hours under an $N_2$ atmosphere.

Thereafter, the temperature was lowered, thereby providing the sintered tablet of the solid electrolyte.

Example 1

[Synthesis of Solid Electrolyte]

The synthesis was carried out in the same way as in the comparative example 1.

[Synthesis of Composite Oxide]

Raw materials containing lithium hydroxide monohydrate ($LiOH \cdot H_2O$) and bismuth oxide $Bi_2O_3$ were weighed so as to provide a composite oxide composition as shown in Table 1 below.

Next, the weighed raw materials were mixed with the use of an agate mortar.

The obtained mixed powder was subjected to calcination at 600° C. for 5 hours under an $N_2$ atmosphere to obtain a calcined powder.

A mixed solvent of toluene-acetone was added to the obtained calcined powder, and the mixture was subjected to grinding with a planetary ball mill for 12 hours to obtain a composite oxide powder.

[Preparation of Tablet]

The solid electrolyte powder and the composite oxide powder were weighed such that the content of the composite oxide was achieved as shown in Table 1, and mixed with the use of a mortar to obtain a mixed powder.

Next, the mixed powder, a butyral resin, and an alcohol were mixed in proportions by mass of 200:15:140, and alcohol was then removed on a hot plate at 80° C., thereby providing a solid electrolyte material powder coated with the butyral resin to serve as a binder.

Next, the solid electrolyte material powder coated with the butyral resin was pressed at 90 MPa and molded into a tablet shape with the use of a tablet molding machine. The obtained solid electrolyte material tablet was subjected to firing at a temperature of 500° C. under an $N_2$ atmosphere, thereby removing the butyral resin, and then subjected to firing at the temperature shown in Table 1 for 10 hours under an oxygen atmosphere. Thereafter, the sintered tablet of the solid electrolyte material was obtained by cooling.

Comparative Example 2

[Synthesis of Solid Electrolyte]
In substantially the same way as in Comparative Example 1 except that lithium hydroxide monohydrate (LiOH.$H_2O$), vanadium oxide $V_2O_5$, and silicon oxide $SiO_2$ were used as raw materials, a solid electrolyte powder was prepared.
[Preparation of Tablet]
A sintered tablet was prepared in substantially the same way as in Comparative Example 1.

Example 2

[Synthesis of Solid Electrolyte]
A solid electrolyte powder was prepared in substantially the same way as in Comparative Example 2.
[Synthesis of Composite Oxide]
A composite oxide powder was prepared in substantially the same way as in Example 1.
[Preparation of Tablet]
A sintered tablet was prepared in substantially the same way as in Example 1.

Comparative Example 3

[Synthesis of Solid Electrolyte]
In substantially the same way as in Comparative Example 1 except that lithium hydroxide monohydrate (LiOH.$H_2O$), lanthanum hydroxide La(OH)$_3$, and titanium oxide $TiO_2$ were used as raw materials, a solid electrolyte powder was prepared.
[Preparation of Tablet]
A sintered tablet was prepared in substantially the same way as in Comparative Example 1.

Example 3

[Synthesis of Solid Electrolyte]
A solid electrolyte powder was prepared in substantially the same way as in Comparative Example 3.
[Synthesis of Composite Oxide]
A composite oxide powder was prepared in substantially the same way as in Example 1.
[Preparation of Tablet]
A sintered tablet was prepared in substantially the same way as in Example 1.
(Evaluation of Ionic Conductivity of Sintered Tablet)
The ionic conductivity was measured in accordance with the following procedure for the sintered tablets prepared according to each of the examples and comparative examples.

First, a Pt layer as a current collector was formed by sputtering on both surfaces of the sintered tablet, and then sandwiched and fixed by two SUS plates (current collectors) to prepare a measurement sample.

The AC impedance of the measurement sample was measured at room temperature (25° C.) in the range of 0.1 MHz to 1 MHz (±50 mV), thereby providing a Nyquist plot. From the Nyquist plot, the resistance of the entire sintered tablet including grains and grain boundaries was read to calculate the ionic conductivity. The results are shown in Table 1.

(Measurement of Relative Density)
The weight of the sintered tablet prepared according to each of the examples and comparative examples was measured with an electronic balance, and the volume was calculated from the actual size of the sintered body tablet with the use of a micrometer. The density of the sintered body tablet was calculated by dividing the obtained weight by the volume, and the relative density (%) was determined from the ratio between the theoretical value and measured value of the density. The results are shown in Table 1.

TABLE 1

| | Solid Electrolyte | | | | | | | Composite Oxide | | |
|---|---|---|---|---|---|---|---|---|---|---|
| | Composition Formula | A | B | a | b | x | y | Crystal Structure | Composition Formula | Content (% by volume) | Li/Bi |
| Comparative Example 1 | $(Li_{6.4}Ga_{0.05}Al_{0.15})La_3Zr_2O_{12}$ | Ga, Al | — | 3 | — | 0.2 | 0 | Garnet | — | — | — |
| Example 1 | $(Li_{6.4}Ga_{0.05}Al_{0.15})La_3Zr_2O_{12}$ | Ga, Al | — | 3 | — | 0.2 | 0 | Garnet | $Li_3BiO_3$ | 3.0 | 3 |
| Comparative Example 2 | $Li_{3.2}V_{0.8}Si_{0.2}O_4$ | — | — | — | — | 0 | 0 | LISICON | — | — | — |
| Example 2 | $Li_{3.2}V_{0.8}Si_{0.2}O_4$ | — | — | — | — | 0 | 0 | LISICON | $Li_3BiO_3$ | 3.0 | 3 |
| Comparative Example 3 | $Li_{0.35}La_{0.55}TiO_3$ | — | — | — | — | 0 | 0 | Perovskite | — | — | — |
| Example 3 | $Li_{0.35}La_{0.55}TiO_3$ | — | — | — | — | 0 | 0 | Perovskite | $Li_3BiO_3$ | 3.0 | 3 |

TABLE 1-continued

| | | Firing Temperature (° C.) | Relative Density (%) | Conductivity (×10⁻⁸ S/cm) |
|---|---|---|---|---|
| | Comparative Example 1 | 800 | 55 | 350 |
| | Example 1 | 800 | 98 | 18000 |
| | Comparative Example 2 | 700 | 62 | 14 |
| | Example 2 | 700 | 85 | 160 |
| | Comparative Example 3 | 800 | 59 | Off-scale low |
| | Example 3 | 800 | 68 | 2.5 |

From the comparison between Comparative Example 1 and Example 1, comparison between Comparative Example 2 and Example 2, and comparison between Comparative Example 3 and Example 3, it is determined that in a case where the solid electrolyte has a garnet structure, a perovskite structure, or a LISICON structure, the ionic conductivity of the sintered tablet can be increased by adding the composite oxide containing Li and Bi. The reason therefor is not clear, but it is believed that in the case of firing at a low temperature of 800° C. or lower, densification does not proceed suitably unless the composite oxide containing Li and Bi is added, thereby resulting in also decreasing the relative density, and then decreasing the ionic conductivity, while densification proceeds suitably by the addition of the composite oxide containing Li and Bi, resulting in increasing the relative density, and then increasing the ionic conductivity.

From the comparison among Examples 1, 2, and 3, it is determined that a higher ionic conductivity is achieved in the case of using the solid electrolyte having a garnet structure or a LISICON structure, while a higher ionic conductivity is achieved in the case of using the solid electrolyte having a garnet structure.

Comparative Example 4

[Synthesis of Solid Electrolyte]
A solid electrolyte powder was prepared in substantially the same way as in Comparative Example 1.
[Synthesis of Composite Oxide]
In substantially the same way as in Example 1 except that lithium hydroxide monohydrate ($LiOH \cdot H_2O$) and boron oxide $B_2O_3$ were used as raw materials, a composite oxide powder was prepared.

[Preparation of Tablet]
A sintered tablet was prepared in substantially the same way as in Example 1. The relative density and ionic conductivity of the prepared tablet were measured by the method mentioned above. The results are shown in Table 2.

Comparative Example 5

[Synthesis of Solid Electrolyte]
A solid electrolyte powder was prepared in substantially the same way as in Comparative Example 1.
[Synthesis of Composite Oxide]
A composite oxide powder was prepared in substantially the same way as in Comparative Example 4.
[Preparation of Tablet]
A sintered tablet was prepared in substantially the same way as in Example 1. The relative density and ionic conductivity of the prepared tablet were measured by the method mentioned above. The results are shown in Table 2.

Comparative Example 6

[Synthesis of Solid Electrolyte]
A solid electrolyte powder was prepared in substantially the same way as in Comparative Example 1.
[Synthesis of Composite Oxide]
In substantially the same way as in Example 1 except that lithium hydroxide monohydrate ($LiOH \cdot H_2O$) and diphosphorus pentoxide $P_2O_5$ were used as raw materials, a composite oxide powder was prepared.
[Preparation of Tablet]
A sintered tablet was prepared in substantially the same way as in Example 1. The relative density and ionic conductivity of the prepared tablet were measured by the method mentioned above. The results are shown in Table 2.

TABLE 2

| | Solid Electrolyte | | | | | | | Composite Oxide | | |
|---|---|---|---|---|---|---|---|---|---|---|
| | Composition Formula | A | B | a | b | x | y | Crystal Structure | Composition Formula | Content (% by volume) | Li/Bi |
| Example 1 | $(Li_{6.4}Ga_{0.05}Al_{0.15})La_3Zr_2O_{12}$ | Ga, Al | — | 3 | — | 0.2 | 0 | Garnet | $Li_3BiO_3$ | 3.0 | 3 |
| Comparative Example 4 | $(Li_{6.4}Ga_{0.05}Al_{0.15})La_3Zr_2O_{12}$ | Ga, Al | — | 3 | — | 0.2 | 0 | Garnet | $Li_3BO_3$ | 3.0 | — |
| Comparative Example 5 | $(Li_{6.4}Ga_{0.05}Al_{0.15})La_3Zr_2O_{12}$ | Ga, Al | — | 3 | — | 0.2 | 0 | Garnet | $Li_3BO_3$ | 10.0 | — |

TABLE 2-continued

| | | | | | | | | | | | |
|---|---|---|---|---|---|---|---|---|---|---|---|
| Comparative Example 6 | $(Li_{6.4}Ga_{0.05}Al_{0.15})La_3Zr_2O_{12}$ | Ga, Al | — | 3 | — | 0.2 | 0 | Garnet | $Li_3PO_4$ | 10.0 | — |

| | Firing Temperature (° C.) | Relative Density (%) | Conductivity ($\times 10^{-8}$ S/cm) |
|---|---|---|---|
| Example 1 | 800 | 98 | 18000 |
| Comparative Example 4 | 800 | 58 | 800 |
| Comparative Example 5 | 800 | 78 | 1000 |
| Comparative Example 6 | 800 | 65 | 500 |

It is determined that even in a case where the composite oxide is added to the solid electrolyte, the high ionic conductivity in the case of containing Li and Bi is not achieved in a case where the added composite oxide contains no Li and Bi. From this result, it is determined that the composite oxide added to the solid electrolyte needs to contain Li and Bi from the viewpoint of achieving high ionic conductivity.

(Comparative Examples 7 and 8)
[Synthesis of Solid Electrolyte]
A solid electrolyte powder was prepared in substantially the same way as in Comparative Example 1.
[Synthesis of Composite Oxide]
A composite oxide powder was prepared in substantially the same way as in Comparative Example 4.
[Preparation of Tablet]
A sintered tablet was prepared in substantially the same way as in Example 1. The relative density and ionic conductivity of the prepared tablet were measured by the method mentioned above. The results are shown in Table 3.

Examples 4 to 6

[Synthesis of Solid Electrolyte]
A solid electrolyte powder was prepared in substantially the same way as in Comparative Example 1.
[Synthesis of Composite Oxide]
A composite oxide powder was prepared in substantially the same way as in Example 1.
[Preparation of Tablet]
A sintered tablet was prepared in substantially the same way as in Example 1. The relative density and ionic conductivity of the prepared tablet were measured by the method mentioned above. The results are shown in Table 3.

TABLE 3

| | Solid Electrolyte | | | | | | | | Composite Oxide | | |
|---|---|---|---|---|---|---|---|---|---|---|---|
| | Composition Formula | A | B | a | b | x | y | Crystal Structure | Composition Formula | Content (% by volume) | Li/Bi |
| Comparative Example 7 | $(Li_{6.4}Ga_{0.05}Al_{0.15})La_3Zr_2O_{12}$ | Ga, Al | — | 3 | — | 0.2 | 0 | Garnet | $Li_3BO_3$ | 10 | — |
| Comparative Example 8 | $(Li_{6.4}Ga_{0.05}Al_{0.15})La_3Zr_2O_{12}$ | Ga, Al | — | 3 | — | 0.2 | 0 | Garnet | $Li_3BO_3$ | 10 | — |
| Comparative Example 5 | $(Li_{6.4}Ga_{0.05}Al_{0.15})La_3Zr_2O_{12}$ | Ga, Al | — | 3 | — | 0.2 | 0 | Garnet | $Li_3BO_3$ | 10 | — |
| Example 4 | $(Li_{6.4}Ga_{0.05}Al_{0.15})La_3Zr_2O_{12}$ | Ga, Al | — | 3 | — | 0.2 | 0 | Garnet | $LiBiO_2$ | 1.5 | 1 |
| Example 5 | $(Li_{6.4}Ga_{0.05}Al_{0.15})La_3Zr_2O_{12}$ | Ga, Al | — | 3 | — | 0.2 | 0 | Garnet | $LiBiO_2$ | 1.5 | 1 |
| Example 6 | $(Li_{6.4}Ga_{0.05}Al_{0.15})La_3Zr_2O_{12}$ | Ga, Al | — | 3 | — | 0.2 | 0 | Garnet | $LiBiO_2$ | 1.5 | 1 |

| | Firing Temperature (° C.) | Relative Density (%) | Conductivity ($\times 10^{-8}$ S/cm) |
|---|---|---|---|
| Comparative Example 7 | 700 | 60 | 540 |
| Comparative Example 8 | 750 | 68 | 580 |
| Comparative Example 5 | 800 | 78 | 1000 |
| Example 4 | 700 | 93 | 12000 |
| Example 5 | 750 | 96 | 21000 |
| Example 6 | 800 | 97 | 26000 |

From the results shown in Table 3, it is determined that in a case where the composite oxide containing Li and Bi is added to the solid electrolyte, the high ionic conductivity is achieved even if the additive amount is small.

Example 7

[Synthesis of Solid Electrolyte]

In substantially the same way as in Comparative Example 1 except that lithium hydroxide monohydrate ($LiOH \cdot H_2O$), aluminum oxide $Al_2O_3$, lanthanum hydroxide $La(OH)_3$, and zirconium oxide $ZrO_2$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 8

[Synthesis of Solid Electrolyte]

In substantially the same way as in Comparative Example 1 except that lithium hydroxide monohydrate ($LiOH \cdot H_2O$), gallium oxide $Ga_2O_3$, scandium oxide $Sc_2O_3$, lanthanum hydroxide $La(OH)_3$, and zirconium oxide $ZrO_2$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 9

[Synthesis of Solid Electrolyte]

In substantially the same way as in Comparative Example 1 except that lithium hydroxide monohydrate ($LiOH \cdot H_2O$), lanthanum hydroxide $La(OH)_3$, zirconium oxide $ZrO_2$, and niobium oxide $Nb_2O_5$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 10

[Synthesis of Solid Electrolyte]

In substantially the same way as in Comparative Example 1 except that lithium hydroxide monohydrate ($LiOH \cdot H_2O$), aluminum oxide $Al_2O_3$, lanthanum hydroxide $La(OH)_3$, zirconium oxide $ZrO_2$, and niobium oxide $Nb_2O_5$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 11

[Synthesis of Solid Electrolyte]

In substantially the same way as in Comparative Example 1 except that lithium hydroxide monohydrate ($LiOH \cdot H_2O$), aluminum oxide $Al_2O_3$, lanthanum hydroxide $La(OH)_3$, zirconium oxide $ZrO_2$, tantalum oxide $Ta_2O_5$, and bismuth oxide $Bi_2O_3$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 12

[Synthesis of Solid Electrolyte]

In substantially the same way as in Comparative Example 1 except that lithium hydroxide monohydrate ($LiOH \cdot H_2O$), lanthanum hydroxide $La(OH)_3$, zirconium oxide $ZrO_2$, and tantalum oxide $Ta_2O_5$ were used as raw materials, a solid electrolyte powder was prepared.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 4.

Example 13

[Synthesis of Solid Electrolyte]

A solid electrolyte powder was prepared in substantially the same way as in Comparative Example 2.

[Synthesis of Composite Oxide]

A composite oxide powder was prepared in substantially the same way as in Example 4.

[Preparation of Tablet]

A sintered tablet was prepared in substantially the same way as in Example 1. The relative density and ionic conductivity of the prepared tablet were measured by the method mentioned above. The results are shown in Table 4.

TABLE 4

| | Composition Formula | A | B | a | b | x | y | Crystal Structure |
|---|---|---|---|---|---|---|---|---|
| Example 1 | $(Li_{6.4}Ga_{0.05}Al_{0.15})La_3Zr_2O_{12}$ | Ga, Al | — | 3 | — | 0.2 | 0 | Garnet |
| Example 7 | $(Li_{6.4}Al_{0.2})La_3Zr_2O_{12}$ | Al | — | 3 | — | 0.2 | 0 | Garnet |
| Example 8 | $(Li_{6.4}Ga_{0.15}Sc_{0.05})La_3Zr_2O_{12}$ | Ga, Sc | — | 3 | — | 0.2 | 0 | Garnet |
| Example 9 | $Li_{6.75}La_3(Zr_{1.75}Nb_{0.25})O_{11}$ | — | Nb | — | 5 | 0 | 0.25 | Garnet |
| Example 10 | $(Li_{6.45}Al_{0.1})La_3(Zr_{1.75}Nb_{0.25})O_{12}$ | Al | Nb | 3 | 5 | 0.1 | 0.25 | Garnet |
| Example 11 | $(Li_{6.175}Al_{0.1})La_3(Zr_{1.475}Ta_{0.105}Bi_{0.42})O_{12}$ | Al | TaBi | 3 | 5 | 0.1 | 0.525 | Garnet |
| Example 12 | $Li_{6.8}La_3(Zr_{1.6}Ta_{0.4})O_{12}$ | — | Ta | — | 5 | 0 | 0.4 | Garnet |
| Example 13 | $Li_{3.2}V_{0.8}Si_{0.2}O_4$ | — | — | — | — | 0 | 0 | LISICON |

| | Composite Oxide | | | | | |
|---|---|---|---|---|---|---|
| | Composition Formula | Content (% by volume) | Li/Bi | Firing Temperature (°C.) | Relative Density (%) | Conductivity ($\times 10^{-8}$ S/cm) |
| Example 1 | $Li_3BiO_3$ | 3.0 | 3 | 800 | 98 | 18000 |
| Example 7 | $Li_3BiO_3$ | 3.0 | 3 | 800 | 94 | 6200 |
| Example 8 | $Li_3BiO_3$ | 3.0 | 3 | 800 | 97 | 24000 |
| Example 9 | $Li_3BiO_3$ | 3.0 | 3 | 800 | 95 | 13000 |
| Example 10 | $Li_3BiO_3$ | 3.0 | 3 | 800 | 93 | 15000 |
| Example 11 | $Li_3BiO_3$ | 3.0 | 3 | 800 | 93 | 8800 |
| Example 12 | $Li_3BiO_3$ | 3.0 | 3 | 800 | 93 | 12000 |
| Example 13 | $LiBiO_2$ | 3.0 | 1 | 700 | 94 | 1400 |

From the results shown in Table 4, it is determined that in a case where the composite oxide containing Li and Bi is added, a high relative density and a high ionic conductivity are achieved even in the case of using solid electrolytes that have various composition formulas.

Comparative Example 9

[Synthesis of Solid Electrolyte]

A solid electrolyte powder was prepared in substantially the same way as in Comparative Example 1.

[Synthesis of Composite Oxide]

In substantially the same way as in Example 1 except that bismuth oxide $Bi_2O_3$ was used as a raw material, a composite oxide powder was prepared.

[Preparation of Tablet]

A sintered tablet was prepared in substantially the same way as in Example 1. The relative density and ionic conductivity of the prepared tablet were measured by the method mentioned above. The results are shown in Table 5.

Examples 14 and 15

[Synthesis of Solid Electrolyte]

A solid electrolyte powder was prepared in substantially the same way as in Comparative Example 1.

[Synthesis of Composite Oxide]

A composite oxide powder was prepared in substantially the same way as in Example 1.

[Preparation of Tablet]

A sintered tablet was prepared in substantially the same way as in Example 1. The relative density and ionic conductivity of the prepared tablet were measured by the method mentioned above. The results are shown in Table 5.

Example 16

[Synthesis of Solid Electrolyte]

A solid electrolyte powder was prepared in substantially the same way as in Comparative Example 1.

[Synthesis of Composite Oxide]

In substantially the same way as in Example 1 except that lithium hydroxide monohydrate ($LiOH \cdot H_2O$), aluminum oxide $Al_2O_3$, and bismuth oxide $Bi_2O_3$ were used as raw materials, a composite oxide powder was prepared.

[Preparation of Tablet]

A sintered tablet was prepared in substantially the same way as in Example 1. The relative density and ionic conductivity of the prepared tablet were measured by the method mentioned above. The results are shown in Table 5.

Example 17

[Synthesis of Solid Electrolyte]

A solid electrolyte powder was prepared in substantially the same way as in Comparative Example 1.

[Synthesis of Composite Oxide]

A $Li_3BiO_3$ powder prepared in substantially the same way as in Example 1 except that lithium hydroxide monohydrate $LiOH \cdot H_2O$ and bismuth oxide $Bi_2O_3$ were used as raw materials, and a $Li_3BO_3$ powder prepared in substantially the same way as in Example 1 except that lithium hydroxide monohydrate $LiOH \cdot H_2O$ and boron oxide $B_2O_3$ were used were mixed at a molar ratio of 50:50, thereby preparing a composite oxide powder.

[Preparation of Tablet]

A sintered tablet was prepared in substantially the same way as in Example 1. The relative density and ionic conductivity of the prepared tablet were measured by the method mentioned above. The results are shown in Table 5.

Example 18

[Synthesis of Solid Electrolyte]
A solid electrolyte powder was prepared in substantially the same way as in Comparative Example 1.
[Synthesis of Composite Oxide]
A $LiBiO_2$ powder prepared in substantially the same way as in Example 1 except that lithium hydroxide monohydrate $LiOH.H_2O$ and bismuth oxide $Bi_2O_3$ were used as raw materials, and a boron oxide $B_2O_3$ powder were mixed at a molar ratio of 75:25, thereby preparing a composite oxide powder.
[Preparation of Tablet]
A sintered tablet was prepared in substantially the same way as in Example 1. The relative density and ionic conductivity of the prepared tablet were measured by the method mentioned above. The results are shown in Table 5.

Example 19

[Synthesis of Solid Electrolyte]
A solid electrolyte powder was prepared in substantially the same way as in Comparative Example 1.
[Synthesis of Composite Oxide]
A $LiBiO_2$ powder prepared in substantially the same way as in Example 1 except that lithium hydroxide monohydrate $LiOH.H_2O$ and bismuth oxide $Bi_2O_3$ were used as raw materials, and a $Li_2WO_4$ powder prepared in substantially the same way as in Example 1 except that lithium hydroxide monohydrate $LiOH.H_2O$ and tungsten oxide $WO_3$ were used were mixed at a molar ratio of 50:50, thereby preparing a composite oxide powder.
[Preparation of Tablet]
A sintered tablet was prepared in substantially the same way as in Example 1. The relative density and ionic conductivity of the prepared tablet were measured by the method mentioned above. The results are shown in Table 5.

Example 20

[Synthesis of Solid Electrolyte]
A solid electrolyte powder was prepared in substantially the same way as in Comparative Example 1.
[Synthesis of Composite Oxide]
A $LiBiO_2$ powder prepared in substantially the same way as in Example 1 except that lithium hydroxide monohydrate $LiOH.H_2O$ and bismuth oxide $Bi_2O_3$ were used as raw materials, and a $Li_2MoO_3$ powder prepared in substantially the same way as in Example 1 except that lithium hydroxide monohydrate $LiOH.H_2O$ and molybdenum oxide $MoO_3$ were used were mixed at a molar ratio of 50:50, thereby preparing a composite oxide powder.
[Preparation of Tablet]
A sintered tablet was prepared in substantially the same way as in Example 1. The relative density and ionic conductivity of the prepared tablet were measured by the method mentioned above. The results are shown in Table 5.

Example 21

[Synthesis of Solid Electrolyte]
A solid electrolyte powder was prepared in substantially the same way as in Comparative Example 1.
[Synthesis of Composite Oxide]
A $LiBiO_2$ powder prepared in substantially the same way as in Example 1 except that lithium hydroxide monohydrate $LiOH.H_2O$ and bismuth oxide $Bi_2O_3$ were used as raw materials, and a $Li_2Te_2O_5$ powder prepared in substantially the same way as in Example 1 except that lithium hydroxide monohydrate $LiOH.H_2O$ and tellurium oxide $TeO_2$ were used were mixed at a molar ratio of 50:50, thereby preparing a composite oxide powder.
[Preparation of Tablet]
A sintered tablet was prepared in substantially the same way as in Example 1. The relative density and ionic conductivity of the prepared tablet were measured by the method mentioned above. The results are shown in Table 5.

TABLE 5

| | Solid Electrolyte | | | | | | | Composite Oxide | | |
| --- | --- | --- | --- | --- | --- | --- | --- | --- | --- | --- |
| | Composition Formula | A | B | a | b | x | y | Crystal Structure | Composition Formula | Content (% by volume) | Li/Bi |
| Comparative Example 9 | $(Li_{6.4}Ga_{0.05}Al_{0.15})La_3Zr_2O_{12}$ | Ga, Al | — | 3 | — | 0.2 | 0 | Garnet | $Bi_2O_3$ | 1.5 | 0 |
| Example 14 | $(Li_{6.4}Ga_{0.05}Al_{0.15})La_3Zr_2O_{12}$ | Ga, Al | — | 3 | — | 0.2 | 0 | Garnet | $Li_3BiO_3$ | 1.5 | 3 |
| Example 6 | $(Li_{6.4}Ga_{0.05}Al_{0.15})La_3Zr_2O_{12}$ | Ga, Al | — | 3 | — | 0.2 | 0 | Garnet | $LiBiO_2$ | 1.5 | 1 |
| Example 15 | $(Li_{6.4}Ga_{0.05}Al_{0.15})La_3Zr_2O_{12}$ | Ga, Al | — | 3 | — | 0.2 | 0 | Garnet | $Li_4Bi_2O_5$ | 1.5 | 2 |
| Example 16 | $(Li_{6.4}Ga_{0.05}Al_{0.15})La_3Zr_2O_{12}$ | Ga, Al | — | 3 | — | 0.2 | 0 | Garnet | $Li_{2.4}Al_{0.2}BiO_3$ | 1.5 | 12 |
| Example 17 | $(Li_{6.4}Ga_{0.05}Al_{0.15})La_3Zr_2O_{12}$ | Ga, Al | — | 3 | — | 0.2 | 0 | Garnet | $50Li_3BiO_3 \cdot 50Li_3BO_3$ | 1.5 | 6 |
| Example 18 | $(Li_{6.4}Ga_{0.05}Al_{0.15})La_3Zr_2O_{12}$ | Ga, Al | — | 3 | — | 0.2 | 0 | Garnet | $75LiBiO_2 \cdot 25B_2O_3$ | 1.5 | 1 |

TABLE 5-continued

| | | | | a | b | x | y | Crystal Structure | Composition Formula | | Li/Bi |
|---|---|---|---|---|---|---|---|---|---|---|---|
| Example 19 | $(Li_{6.4}Ga_{0.05}Al_{0.15})La_3Zr_2O_{12}$ | Ga, Al | — | 3 | — | 0.2 | 0 | Garnet | $50LiBiO_2 \cdot 50Li_2WO_4$ | 1.5 | 3 |
| Example 20 | $(Li_{6.4}Ga_{0.05}Al_{0.15})La_3Zr_2O_{12}$ | Ga, Al | — | 3 | — | 0.2 | 0 | Garnet | $50LiBiO_2 \cdot 50Li_2MoO_3$ | 1.5 | 3 |
| Example 21 | $(Li_{6.4}Ga_{0.05}Al_{0.15})La_3Zr_2O_{12}$ | Ga, Al | — | 3 | — | 0.2 | 0 | Garnet | $50LiBiO_2 \cdot 50Li_2Te_2O_3$ | 1.5 | 3 |

| | Firing Temperature (° C.) | Relative Density (%) | Conductivity ($\times 10^{-8}$ S/cm) |
|---|---|---|---|
| Comparative Example 9 | 800 | 78 | 3200 |
| Example 14 | 800 | 97 | 24000 |
| Example 6 | 800 | 97 | 26000 |
| Example 15 | 800 | 95 | 21000 |
| Example 16 | 800 | 95 | 26000 |
| Example 17 | 800 | 92 | 20000 |
| Example 18 | 800 | 95 | 18000 |
| Example 19 | 800 | 93 | 15000 |
| Example 20 | 800 | 91 | 11000 |
| Example 21 | 800 | 95 | 20000 |

From the results shown in Table 5, it is determined that a high ionic conductivity is achieved even in the case of using composite oxides represented by various composition formulas containing Li and Bi.

Examples 22 to 28

[Synthesis of Solid Electrolyte]
A solid electrolyte powder was prepared in substantially the same way as in Comparative Example 1.

[Synthesis of Composite Oxide]
A composite oxide powder was prepared in substantially the same way as in Example 1.

[Preparation of Tablet]
A sintered tablet was prepared in substantially the same way as in Example 1. The relative density and ionic conductivity of the prepared tablet were measured by the method mentioned above. The results are shown in Table 6.

TABLE 6

| | Solid Electrolyte | | | | | | | | Composite Oxide | | |
|---|---|---|---|---|---|---|---|---|---|---|---|
| | Composition Formula | A | B | a | b | x | y | Crystal Structure | Composition Formula | Content (% by volume) | Li/Bi |
| Comparative Example 1 | $(Li_{6.4}Ga_{0.05}Al_{0.15})La_3Zr_2O_{12}$ | Ga, Al | — | 3 | — | 0.2 | 0 | Garnet | — | — | — |
| Example 22 | $(Li_{6.4}Ga_{0.05}Al_{0.15})La_3Zr_2O_{12}$ | Ga, Al | — | 3 | — | 0.2 | 0 | Garnet | $Li_3BiO_3$ | 0.2 | 3 |
| Example 23 | $(Li_{6.4}Ga_{0.05}Al_{0.15})La_3Zr_2O_{12}$ | Ga, Al | — | 3 | — | 0.2 | 0 | Garnet | $Li_3BiO_3$ | 0.5 | 3 |
| Example 24 | $(Li_{6.4}Ga_{0.05}Al_{0.15})La_3Zr_2O_{12}$ | Ga, Al | — | 3 | — | 0.2 | 0 | Garnet | $Li_3BiO_3$ | 1.0 | 3 |
| Example 25 | $(Li_{6.4}Ga_{0.05}Al_{0.15})La_3Zr_2O_{12}$ | Ga, Al | — | 3 | — | 0.2 | 0 | Garnet | $Li_3BiO_3$ | 1.5 | 3 |
| Example 1 | $(Li_{6.4}Ga_{0.05}Al_{0.15})La_3Zr_2O_{12}$ | Ga, Al | — | 3 | — | 0.2 | 0 | Garnet | $Li_3BiO_3$ | 3.0 | 3 |
| Example 26 | $(Li_{6.4}Ga_{0.05}Al_{0.15})La_3Zr_2O_{12}$ | Ga, Al | — | 3 | — | 0.2 | 0 | Garnet | $Li_3BiO_3$ | 5.0 | 3 |
| Example 27 | $(Li_{6.4}Ga_{0.05}Al_{0.15})La_3Zr_2O_{12}$ | Ga, Al | — | 3 | — | 0.2 | 0 | Garnet | $Li_3BiO_3$ | 10.0 | 3 |
| Example 28 | $(Li_{6.4}Ga_{0.05}Al_{0.15})La_3Zr_2O_{12}$ | Ga, Al | — | 3 | — | 0.2 | 0 | Garnet | $Li_3BiO_3$ | 20.0 | 3 |

| | Firing Temperature (° C.) | Relative Density (%) | Conductivity ($\times 10^{-8}$ S/cm) |
|---|---|---|---|
| Comparative Example 1 | 800 | 55 | 350 |
| Example 22 | 800 | 68 | 1500 |
| Example 23 | 800 | 88 | 15000 |
| Example 24 | 800 | 96 | 21000 |
| Example 25 | 800 | 97 | 24000 |
| Example 1 | 800 | 98 | 18000 |
| Example 26 | 800 | 98 | 13000 |
| Example 27 | 800 | 97 | 10000 |
| Example 28 | 800 | 95 | 4000 |

From the results shown in Table 6, it is determined that the content of the composite oxide is preferably 0.5% by volume or more and less than 20% by volume, more preferably 0.5% by volume or more and 10% by volume or less, yet more preferably 0.5% by volume or more and 5% by volume or less in the solid electrolyte material, from the viewpoint of achieving a high ionic conductivity.

The solid electrolyte material according to the present invention includes a composite oxide containing Li and Bi, and a solid electrolyte having a garnet structure, a perovskite structure, or a LISICON structure. Even in a case where the solid electrolyte material according to the present invention is subjected to, for example, firing at a low temperature of 800° C. or lower, a high ionic conductivity can be achieved. Accordingly, the use of the solid electrolyte material according to the present invention can achieve a solid electrolyte layer and an electrode which have a high ionic conductivity, and a battery including at least one of the layer and the electrode.

The solid electrolyte preferably has a garnet structure or a LISICON structure, and more preferably has a garnet structure. This configuration can further increase the ionic conductivity of the solid electrolyte material fired at a low temperature.

The solid electrolyte is preferably a solid electrolyte represented by the composition formula $(Li_{[7-ax-(b-4)\,y]}A_x)\,La_3Zr_{2-y}B_yO_{12}$.

In the above composition formula, A represents at least one element selected from the group consisting of Ga, Al, Mg, Zn, and Sc; B represents at least one element selected from the group consisting of Nb, Ta, W, Te, Mo, and Bi; $0 \leq x \leq 0.5$; $0 \leq y \leq 2.0$; a represents an average valence for A; and b represents an average valence for B.

This configuration can further increase the ionic conductivity of the solid electrolyte material fired at a low temperature.

The content of the composite oxide is preferably 0.5% by volume or more and less than 20% by volume. This composition can achieve a high ionic conductivity.

The molar ratio (Li/Bi) of Li to Bi in the composite oxide is preferably 1.0 or more. This composition can achieve a member including a solid electrolyte which is high in relative density and high in ionic conductivity.

The solid electrolyte layer according to the present invention includes a fired product of the solid electrolyte material according to the present invention. Thus, the solid electrolyte layer according to the present invention has a high ion conductivity.

The battery according to the present invention includes a negative electrode, a solid electrolyte layer provided on the negative electrode, and a positive electrode provided on the solid electrolyte layer. The solid electrolyte layer includes the solid electrolyte layer according to the present invention.

DESCRIPTION OF REFERENCE SYMBOLS

1: all solid state battery
11: positive electrode
12: negative electrode
13: solid electrolyte layer

The invention claimed is:

1. A solid electrolyte material comprising:
a composite oxide containing Li and Bi; and
at least one solid electrolyte having a garnet structure, a perovskite structure, and a LISICON structure,
wherein a content of the composite oxide is 0.5% by volume to less than 20% by volume.

2. The solid electrolyte material according to claim 1, wherein the solid electrolyte has a garnet structure or a LISICON structure.

3. The solid electrolyte material according to claim 1, wherein the solid electrolyte has a garnet structure.

4. The solid electrolyte material according to claim 3, wherein the garnet structure is represented by a composition formula $(Li_{[7-ax-(b-4)y]}A_x)\,La_3Zr_{2-y}B_yO_{12}$, wherein, A is at least one element selected from the group consisting of Ga, Al, Mg, Zn, and Sc; B is at least one element selected from the group consisting of Nb, Ta, W, Te, Mo, and Bi; $0 \leq x \leq 0.5$; $0 \leq y \leq 2.0$; a is an average valence for A; and b is an average valence for B.

5. The solid electrolyte material according to claim 3, wherein the garnet structure is $(Li_{6.4}Ga_{0.05}Al_{0.15})La_3Zr_2O_{12}$, $(Li_{6.4}Al_{0.2})La_3Zr_2O_{12}$, $(Li_{6.4}Ga_{0.15}Sc_{0.05})La_3Zr_2O_{12}$, $Li_{6.75}La_3(Zr_{1.75}Nb_{0.25})O_{11}$, $(Li_{6.45}Al_{0.1})La_3(Zr_{1.75}Nb_{0.25})O_{12}$, $(Li_{6.175}Al_{0.1})La_3(Zr_{1.475}Ta_{0.105}Bi_{0.42})O_{12}$, or $Li_{6.6}La_3(Zr_{1.6}Ta_{0.4})O_{12}$.

6. The solid electrolyte material according to claim 1, wherein the content of the composite oxide is 1.0% by volume to 10% by volume.

7. The solid electrolyte material according to claim 1, wherein a molar ratio of Li to Bi in the composite oxide is 1.0 or more.

8. The solid electrolyte material according to claim 1, wherein the solid electrolyte material further includes at least one of a NASICON-type solid electrolyte, a ramsdellite-type solid electrolyte, and Li-B alumina.

9. The solid electrolyte material according to claim 1, wherein the Bi in the composite oxide is trivalent Bi or pentavalent Bi.

10. The solid electrolyte material according to claim 1, wherein the composite oxide containing Li and Bi has a melting point of 800° C. or lower.

11. The solid electrolyte material according to claim 1, wherein the composite oxide containing Li and Bi further contains at least one of B, Si, P, W, Mo, and Te.

12. The solid electrolyte material according to claim 1, wherein the solid electrolyte material further includes at least one of a composite oxide composed of La and Zr, a composite oxide composed of Li and Zr, and a composite oxide composed of Li and Al.

13. A solid electrolyte layer comprising a fired product of the solid electrolyte material according to claim 1.

14. An all solid state battery comprising:
a negative electrode;
a solid electrolyte layer according to claim 13 on the negative electrode; and
a positive electrode on the solid electrolyte layer.

* * * * *